(12) United States Patent
Fang et al.

(10) Patent No.: US 12,533,379 B2
(45) Date of Patent: Jan. 27, 2026

(54) APPLICATION OF TREM2$^{hi}$ MACROPHAGES IN THE PREPARATION OF DRUGS FOR THE TREATMENT OF CARDIAC DYSFUNCTION

(71) Applicant: ZHEJIANG UNIVERSITY, Hangzhou (CN)

(72) Inventors: Xiangming Fang, Hangzhou (CN); Kai Zhang, Hangzhou (CN); Shiyu Chen, Hangzhou (CN); Jiali Mao, Hangzhou (CN); Yang Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 753 days.

(21) Appl. No.: 17/981,448

(22) Filed: Nov. 6, 2022

(65) Prior Publication Data
US 2023/0158069 A1     May 25, 2023

(30) Foreign Application Priority Data
Nov. 25, 2021   (CN) .......................... 202111411702.5

(51) Int. Cl.
*A61K 35/15*     (2025.01)
*A61P 9/00*       (2006.01)
*C12N 5/0786*  (2010.01)

(52) U.S. Cl.
CPC ................ *A61K 35/15* (2013.01); *A61P 9/00* (2018.01); *C12N 5/0645* (2013.01)

(58) Field of Classification Search
CPC ... A61P 9/00; A61P 9/10; A61K 35/15; C12N 5/0645
See application file for complete search history.

(56) References Cited

PUBLICATIONS

Cochain et al. "Single-Cell RNA-Seq Reveals the Transcriptional Landscape and Heterogeneity of Aortic Macrophages in Murine Atherosclerosis" Circulation Research Jun. 8, 2018, pp. 1661-1674 (Year: 2018).*

Hou et al. "TREM2 sustains macrophage-hepatocyte metabolic coordination in nonalcoholic fatty liver disease and sepsis" J Clin Invest. 2021;131(4):e135197. https://doi.org/10.1172/JCI135197, 17 pages (Year: 2021).*

Ye et al. "Triggering receptor expressed on myeloid Cells-2 (TREM2) inhibits steroidogenesis in adrenocortical cell by macrophage-derived exosomes in lipopolysaccharide-induced septic shock" Molecular and Cellular Endocrinology 525 (2021) 111178, 11 pages (Year: 2021).*

José A Nicolás-Ávila, at el. A Network of Macrophage Supports Mitochondrial Homeostasis in the Heart, Cell. Oct. 1, 2020; 183(1):94-109.e23.

* cited by examiner

*Primary Examiner* — Thane Underdahl
(74) *Attorney, Agent, or Firm* — Jiwen Chen; Joywin IP Law PLLC (57) ABSTRACT

The present invention discloses an application of TREM2$^{hi}$ macrophages in preparation of drugs for treating cardiac dysfunction, and belongs to the technical field of medicine. The present invention discloses for the first time that there is a kind of macrophage subsets for high expression of a triggering receptor expressed on myeloid cells-2 in cardiac derived macrophages, which has a strong function of recognizing and reducing mitochondrial damage and plays an important role in maintaining a cardiac metabolic balance. Therefore, the TREM2$^{hi}$ macrophages have important application value in treatment of the cardiac dysfunction.

7 Claims, 7 Drawing Sheets

APPLICATION OF TREM2$^{hi}$ MACROPHAGES IN THE PREPARATION OF DRUGS FOR THE TREATMENT OF CARDIAC DYSFUNCTION

This application claims priority of Chinese Application No. 2021114117025, filed Nov. 25, 2021, all of which are hereby incorporated by reference.

TECHNICAL FIELD

The present invention relates to the technical field of medicine, in particular to an application of TREM2$^{hi}$ macrophages in the preparation of drugs for treating cardiac dysfunction.

BACKGROUND TECHNOLOGY

Cardiac dysfunction is an urgent public health problem worldwide. Although there are corresponding treatment methods, prognosis is still very poor. Existing treatment methods can improve clinical symptoms, but cannot completely solve the dysfunction of cardiomyocytes. It is possible to treat cardiac dysfunction or restore cardiac function to normal by improving a cardiac microenvironment and promoting the repair of cardiomyocytes. Therefore, it is crucial to explore the pathophysiological mechanism of cardiac dysfunction and explore effective and targeted treatment strategies to prevent and treat cardiac dysfunction.

The heart, as the most active organ of human metabolism, has the highest content of mitochondria in all tissues to meet the huge energy demand of systole and diastole of cardiomyocytes. In a case of cardiac dysfunction, mitochondrial disorder not only reduces ATP (adenosine triphosphate) production, but also directly leads to damage and death of cardiomyocytes, thereby resulting in disease progression. Abnormal mitochondria are the main source of generating reactive oxygen species (ROS), which can induce the damage of cardiomyocytes; the abnormal mitochondria promote programmed cell death by releasing cytochrome C into cytoplasm and activating caspase; damaged mitochondria promote local inflammatory response, leading to inflammatory damage of cardiomyocytes. Mitochondrial damage is also associated with abnormal cellular calcium homeostasis, vascular smooth muscle pathology, myofiber division and cell differentiation, which are important pathogenesis of cardiac insufficiency. Therefore, maintaining the stability of the quantity and quality of myocardial mitochondria is essential for the maintenance of cardiac tissue homeostasis and the recovery of cardiac dysfunction.

It is well known that macrophages play an important role in the occurrence and development of cardiac dysfunction. At the early stage of heart injury, a large number of macrophages and other immune cells infiltrate and activate in myocardial tissue, playing proinflammatory and phagocytic roles. With the progression of diseases, infiltrating macrophages transform from proinflammatory macrophages into repair promoting macrophages to repair damaged myocardial tissue. However, at present, there are still some blind spots in the understanding of the cellular and molecular basis of heart injury repair.

The latest research has found that, under normal conditions, cardiomyocytes with vigorous metabolism discharge damaged mitochondria in a form of vesicles, and the accumulation of the damaged mitochondria in the heart and released ROS, mtDNA, etc. will aggravate myocardial damage, while cardiac macrophages maintain the stability of the cardiac tissue microenvironment by clearing these vesicles containing the damaged mitochondria (Jose A Nicolás-Ávila, at el. A Network of Macrophage Supports Mitochondrial Homeostasis in the Heart, Cell. 2020 Oct. 1; 183(1):94-109.e23.).

Macrophage subsets play different functions in physiological and pathological conditions, including participation in inflammatory regulation, pathogen clearance, immune monitoring, cardiovascular development, electrical conduction, myocardial repair, etc. The results of cardiac single cell sequencing have revealed that cardiac macrophage subsets have transcriptional differences, which confirms that they had high heterogeneity and different phenotypes and functions. However, among the different immune cell subsets infiltrated in the heart tissue after cardiac dysfunction, which macrophage subsets are closely related to the recovery and protection of cardiac function? At present, there is no research report.

SUMMARY OF THE INVENTION

The present invention aims to explore macrophage subsets that can be used for repairing damaged cardiomyocytes after cardiac dysfunction, and apply them to the treatment of cardiac dysfunction.

In order to achieve the above purpose, the present invention adopts the following technical solutions.

The present invention provides an application of TREM2$^{hi}$ macrophages in preparation of drugs for treating cardiac dysfunction. The TREM2$^{hi}$ macrophages are macrophages that express a triggering receptor expressed on myeloid cells-2 (TREM2).

The research of the present invention finds that there is a kind of macrophage subsets for high expression of TREM2 in cardiac macrophages, which can significantly improve cardiac dysfunction, improve cardiac microenvironment and protect cardiac function.

Specifically, the TREM2$^{hi}$ macrophages are cardiac derived macrophages that highly express the TREM2.

Further, the TREM2$^{hi}$ macrophages are a kind of subsets in cardiac immune cells that simultaneously express CD45, CD11b, F4/80, CD163 and TREM2.

A method for extracting the TREM2$^{hi}$ macrophages comprises: firstly, taking a cardiac ventricular tissue of a donor, conducting homogenate digestion to prepare a cell suspension, then conducting separation with Percoll to obtain a mixed solution of non-myocardial cells (including immune cells, endothelial cells and fibroblasts), then adding a TREM2 primary antibody to the mixed solution of non-myocardial cells, after incubation, adding a CD45 antibody, a CD11b antibody, an F4/80 antibody, a CD163 antibody and a TREM2 secondary antibody, conducting incubation, and finally, sorting out active nucleated CD45$^+$CD11b$^+$F4/80$^+$TREM2$^+$CD163$^+$ cells by fluorescence-activated cell sorting, namely the TREM2$^{hi}$ macrophages.

The research has showed that, under pathological conditions, the number of damaged mitochondria released from mouse cardiomyocytes is increased, and a large number of the damaged mitochondria are accumulated in a myocardial interstitium; mice with TREM2 gene deletion show dysfunction of macrophages in phagocytosis of damaged mitochondria. In the present invention, the TREM2$^{hi}$ macrophages are separated and extracted from hearts of healthy mice, and injected into cardiac dysfunction models by intrapericardial injection, so that the effect of the TREM2$^{hi}$ macrophages on the treatment of cardiac dysfunction is studied, and it is proved that the TREM2$^{hi}$ macrophages have a good therapeutic effect.

Specifically, the cardiac dysfunction is manifested as increase of damaged mitochondria released by cardiomyocytes.

Further, the cardiac dysfunction is caused by sepsis or myocardial infarction.

Further, the cardiac dysfunction is cardiac failure.

Specifically, the drug realizes a purpose to improve the cardiac dysfunction by reducing the damaged mitochondria in the cardiomyocytes.

The research has showed that, through treatment by TREM2$^{hi}$ macrophages, the levels of cardiac troponin I, lactate dehydrogenase and lactic acid in serum of cardiac dysfunction model mice can be reduced; the levels of expression of inflammatory factors such as interleukin (IL)-1β, IL-6, tumor necrosis factor-α (TNF-α) in cardiac tissue and the levels of atrial natriuretic peptide (ANP) and brain natriuretic peptide (BNP) are significantly reduced.

Further, the drug is administered by intrapericardial injection. The research has showed that, through intrapericardial injection of the TREM2$^{hi}$ macrophages, the TREM2$^{hi}$ macrophages infiltrate around the cardiomyocytes, which plays a protective role on the cardiomyocytes.

Further, the drug includes an effective dose of TREM2$^{hi}$ macrophages and a pharmaceutically acceptable carrier. The pharmaceutically acceptable carrier may be Matrigel.

The present invention has the following beneficial effects.

The present invention discloses for the first time that there is a kind of macrophage subsets for high expression of a triggering receptor expressed on myeloid cells-2 in cardiac derived macrophages, which has a strong function of recognizing and clearing damaged mitochondria and plays an important role in maintaining a cardiac metabolic balance. Therefore, the TREM2$^{hi}$ macrophages have important application value in treatment of the cardiac dysfunction.

DETAILED DESCRIPTION OF THE EMBODIMENTS

The present invention is further illustrated below in combination with specific embodiments. The following embodiments are only used to illustrate the present invention and are not intended to limit the scope of application of the present invention. Without departing from the spirit and essence of the present invention, any amendment or replacement made to the method, step or condition of the present invention belongs to the scope of the present invention.

Test methods used in the following embodiments are all conventional methods unless otherwise specified; materials, reagents, etc. used can be obtained from commercial sources unless otherwise specified.

Wild-type C57BL/6 is purchased from Shanghai Slac Laboratory Animal Co., Ltd.;

TREM2$^{-/-}$ mice are presented by Professor Marco Colonna, Washington University in St. Louis;

TREM2 primary antibody: Rat anti Human/Mouse TREM2 Antibody (R&D Systems);

TREM2 secondary antibody: Donkey anti-Rat IgG (H+L) Highly Cross-Adsorbed Secondary Antibody, Alexa Fluor Plus 647 (Thermo Fisher Scientific);

CD45: Rat anti-Mouse CD45 Antibody, AF700 (BD Biosciences);

CD11b: Rat anti-mouse/human CD11b antibody (BioLegend);

F4/80: Rat anti-mouse F4/80 Antibody, PE (BioLegend);

CD163: Rat anti-mouse CD163 Antibody, Super Bright 600 (Thermo Fisher Scientific);

Percoll: Yeasen Biotechnology (Shanghai) Co., Ltd.;

DPBS: Dulbecco's Phosphate Buffered Saline (DPBS), without Calcium and Magnesium (Biological Industries);

LiberaseTL: Liberase™ TL Research Grade (Sigma-Aldrich);

Dnase I: Sinopharm Chemical Reagent Co., Ltd.;

HEPES: Sigma-Aldrich;

EDTA: Sinopharm Chemical Reagent Co., Ltd.;

FBS: Certified Fetal Bovine Serum (Biological Industries);

HBSS: 1× Hanks' Balanced Salt Solution (HBSS), Sterile (Sangon Biotech);

Matrigel: Corning.

Embodiment 1 Under an attack of systemic inflammation, a cardiac function of a mouse was damaged, and the number of damaged mitochondria released by cardiomyocytes was increased, and a large number of damaged mitochondria were accumulated in a myocardial interstitium.

After a male mouse was anesthetized by intraperitoneal injection of ketamine (50 mg/kg) and midazolam (5 mg/kg), a cecum was exposed through a longitudinal incision 1.5 cm below an abdomen. Three quarters of a distal end of the cecum was ligated with a 4-0 silk thread and punctured with a 22G needle. The cecum was placed into a peritoneal cavity, and the incision was sutured with a 4-0 silk thread. After operation, the mouse was subcutaneously injected with 1 ml of sterile normal saline and they could eat and drink freely after waking up, which was namely a sepsis cecal ligation and puncture (CLP) model. At the same time, a sham operation group was set up (only a cecum was exposed without ligation and perforation).

Echocardiography was conducted on mice at different time points after operation, serum and cardiac tissue were collected, serum cTNI and LDH levels were detected, and cardiac injury indexes ANP and BNP were detected by qPCR.

Figure 1:
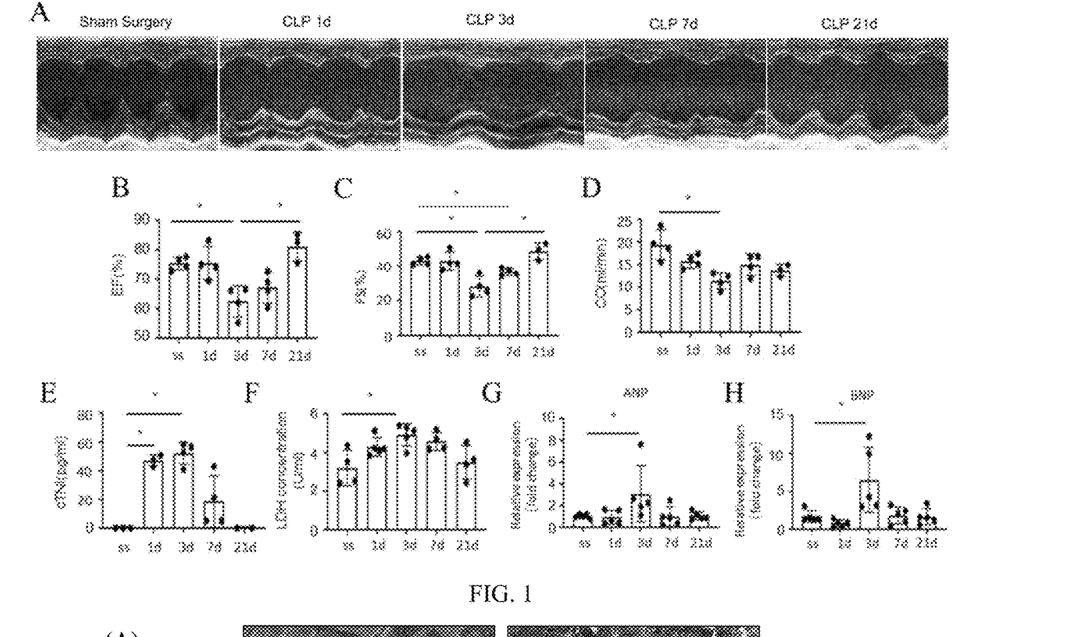
FIG. 1 shows changes of cardiac indexes at different time points after a cecal ligation and puncture (CLP) cardiac dysfunction model in a mouse in Embodiment 1, in which (A) is an echocardiography, (B) is a cardiac ejection fraction (EF), (C) is a cardiac fractional shortening (FS), (D) is a cardiac output (CO), (E) is a change of serum cardiac troponin I (cTNI) after models, (F) is a change of serum lactate dehydrogenase (LDH), (G) is a relative change of mRNA of atrial natriuretic peptide (ANP) in cardiac tissue, and (H) is a relative change of mRNA of brain natriuretic peptide (BNP) in cardiac tissue. * represents P<0.05;  represents P<0.01; * represents P<0.001, the same below.

Results were shown in FIG. 1, and echocardiography results showed that a sepsis-induced cardiac dysfunction model was successfully established. After sepsis, cardiac functions EF, FS and CO in the mouse were significantly damaged, myocardial injury indexes serum cTNI and LDH of the mouse were increased, and cardiac failure indexes ANP and BNP expressions were increased.

Figure 2:
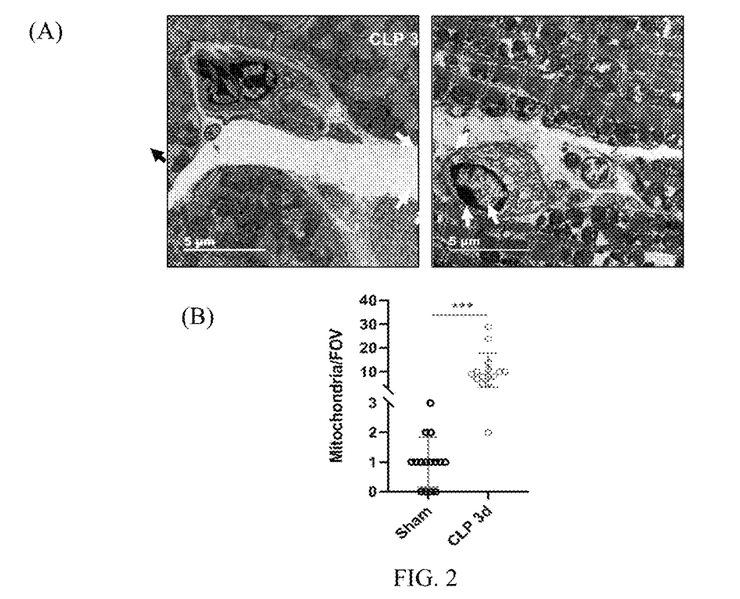
FIG. 2 shows a number of damaged mitochondria in myocardial interstitium of mice after 3 days of the CLP model in Embodiment 1 and in a control group, in which (A) is a number change of mitochondria observed by an electron microscope, and (B) is a statistical chart.

As shown in FIG. 2, damaged mitochondria were accumulated in a myocardial interstitium 3 days after sepsis.

Embodiment 2 Phagocytosis and Clearing of Abnormal Mitochondria in a Damaged Heart by TREM2$^+$ Macrophages After male wild-type C57BL/6 and TREM2$^{-/-}$ mice were anesthetized, sepsis CLP models were established respectively. Phagocytosis of damaged mitochondria by macrophages and accumulation of intermyocardial damaged mitochondria were detected by an electron microscopy 7 days after operation.

Figure 3:
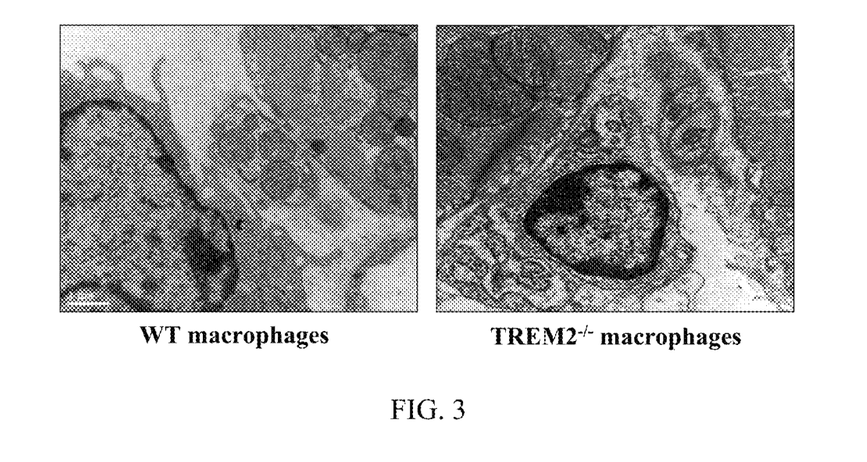
FIG. 3 shows an electron microscopic picture of phagocytosis of mitochondrial vesicles by macrophages in hearts of wild-type C57BL/6 and TREM2$^{-/-}$ mice in Embodiment 2.

As shown in FIG. 3, macrophages in a heart of the wild-type C57BL/6 mouse phagocytosed the damaged mitochondria. The TREM2$^{-/-}$ mouse showed dysfunction of phagocytosis of damaged mitochondria by macrophages.

Figure 4:
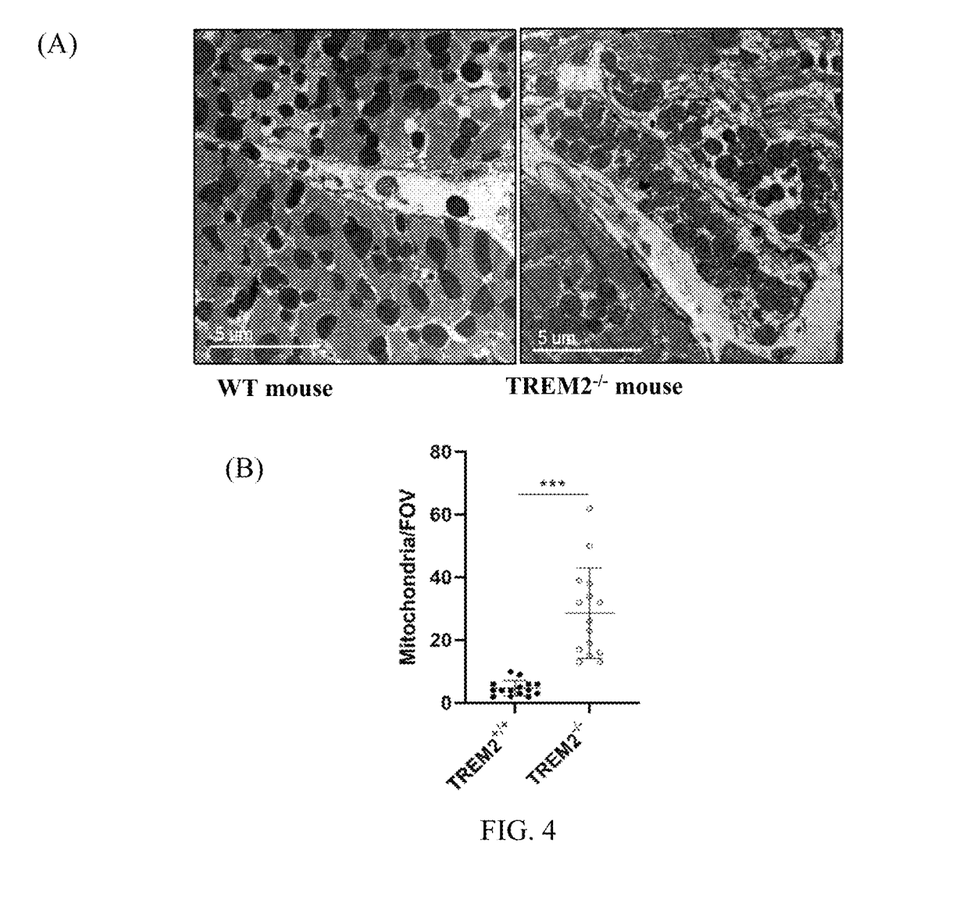
FIG. 4 shows disorder of clearing damaged mitochondria in hearts of wild-type C57BL/6 and TREM2$^{-/-}$ mice after sepsis in Embodiment 2, in which (A) is a number change of mitochondria observed by electron microscope, and (B) is a statistical chart.

As shown in FIG. 4, after a sepsis cardiac dysfunction model, a large number of intermyocardial damaged mitochondria of the TREM2" mouse were accumulated, suggesting that the deletion of a TREM2 gene in the macrophages affected the clearing and phagocytosis of damaged mitochondria.

Embodiment 3 Extracting and Sorting of Heart Derived TREM2$^{-/-}$ Macrophages

A thoracic cavity of a wild-type C57BL/6 mouse was opened after anesthesia, and its heart was perfused with 15 mL of DPBS (Dulbecco's phosphate-buffered saline). Subsequently, the heart was removed, surrounding adipose tissue and an atrium were removed, and a heart ventricle was cut into fragments of about 1 mm$^3$. Digestion was conducted for 15 minutes at 37° C. in a serum-free 1640 medium containing 0.25 mg/mL Liberase TL, 20 µg/mL Dnase I and 10 mM HEPES. A tissue suspension was blown and be+aten by using a 1000 µL micropipettor. A cell suspension was filtered with a 70 µm filter to remove remaining undigested tissue fragments, and then diluted in 1 mL HBSS (Hanks' Balanced Salt Solution).

An isotonic percoll solution was prepared from a percoll stock solution and 10×DPBS in 1:9. A 60% percoll solution and a 15% percoll solution were prepared with PBS (Phosphate-buffered saline) respectively, and 3 mL of a 60% percoll solution was taken and added into a 15 mL centrifuge tube. The centrifuge tube was tilted, and 5 mL of 15% percoll was added along a tube wall to form a gradient interface.

The cell suspension was spread on an upper layer of the gradient interface of the percoll solution, and centrifuged at 400 g and 4° C. for 20 minutes. A cell layer between liquid surfaces was collected, washed twice with 10 mL of PBS, and resuspended with 200 µL of DPBS, that is, a mouse heart single cell suspension was obtained, mainly non-myocardial cells, including immune cells, endothelial cells and fibroblasts.

A TREM2 primary antibody was added into the heart single cell suspension, incubated at 4° C. for 30 minutes, and washed with DPBS, and then 200 µL of DPBS was added for resuspension. A CD45 antibody, a CD11b antibody, an F4/80 antibody, a CD163 antibody and a TREM2 secondary antibody were then added, incubated at 4° C. for 30 minutes, and washed with DPBS, and then 200 µL of DPBS was added for resuspension. A reactive dye (Calcein and/or Vybrant® DyeCycle™ Ruby) was incubated at 4° C. for 10 minutes. After incubation, active nucleated CD45$^+$CD11b$^+$F4/80$^+$ TREM2$^+$CD163$^+$ cells were sorted out with a 100 µm nozzle on a Beckman mofloAstrios EQ instrument. That is, TREM2$^{hi}$ macrophages were obtained. Single cells were sorted into PBS containing 5% FBS (Fetal bovine serum) and counted under a microscope. A density of the cell suspension was adjusted to 8×10$^6$ pieces/ml with PBS, and the cell suspension was placed on ice.

Through cell count analysis, it could be obtained that CD45$^+$ immune cells account for about 10% of non-myocardial cells in the heart, while TREM2 macrophages account for about 40% of immune cells.

Embodiment 4 Intrapericardial Cell Injection

A mouse was anesthetized, ventilated by endotracheal intubation parallel with a ventilator, routinely sterilized and covered with drapes. A 2 cm incision was cut in a direction of a connecting line between a left axilla and a lower end of a sternum by using an intersection of a connecting line between a 3-4th intercostal space and the lower end of the sternum and a connecting line between the left axilla and the lower end of the sternum as a midpoint. An exposed heart was fixed. 25 µL Matrigel (Corning) containing 2×10$^5$ cells sorted in Embodiment 1 was injected into a pericardial cavity slowly and uniformly at three points with a 50 µL microinjector and a 30G insulin injection needle. The incision was sutured with a 4-0 silk thread and thoracic cavity gas was extracted. The mouse was subcutaneously injected with 1 mL of sterile normal saline. After awakening, the ventilator was removed and the mouse could eat and drink freely.

Embodiment 5 Infiltration of Heart Derived TREM2$^{hi}$ Macrophages by Intrapericardial Injection into Heart The TREM2$^{hi}$ macrophages extracted from the WT mouse in Embodiment 3 were taken, and transfected with an adenovirus with a green fluorescent protein, which is used for labeling the TREM2$^{hi}$ macrophages, and the TREM2$^{hi}$ macrophages were injected into a pericardial cavity of the receptor WT mouse. After 3 days, the mouse was anesthetized, a heart tissue was taken, and after frozen, a section was stained with DAPI (4',6-diamidino-2-phenylindole) and observed by a confocal microscope.

Figure 5:
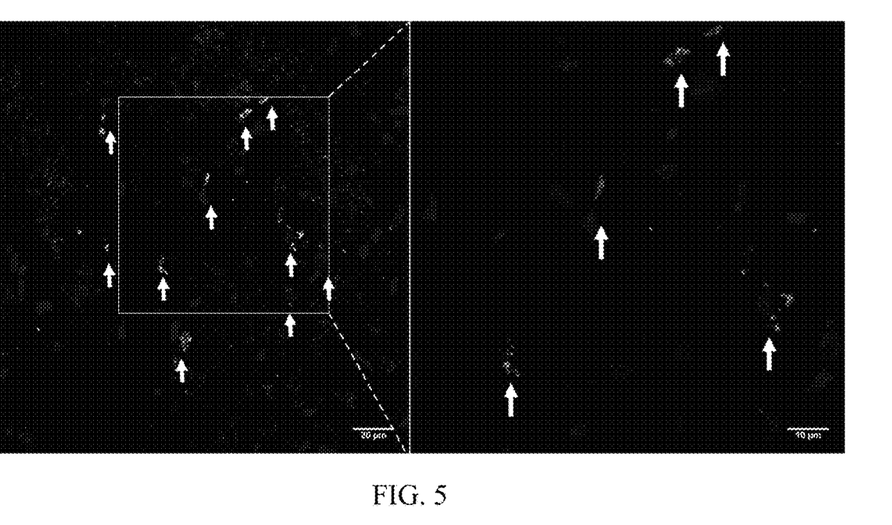
FIG. 5 shows an immunofluorescence image of a heart tissue section after 3 days of injection of mouse heart derived TREM2$^{hi}$ macrophages in Embodiment 5, in which a blue color is DAPI, a green color is injected TREM2$^{hi}$ macrophage, a scale on a left picture is 20 μm, and a right picture is an enlarged view of a box in the left picture, with a scale of 10 μm.

As shown in FIG. 5, TREM2$^{hi}$ macrophages still existed in the heart of the receptor mouse after 3 days.

Embodiment 6 Improvement of Cardiac Function of Sepsis Cardiac Dysfunction Mice by Heart Derived TREM2$^{hi}$ Macrophages WT mice were subjected to echocardiography. Healthy mice were selected to be respectively intrapericardially injected with the TREM2$^{hi}$ macrophages and the Non-TREM2$^{hi}$ macrophages (other cells excluding TREM2$^{hi}$ macrophages from CD45$^+$ immune cells) sorted in Embodiment 3, without closing abdomens and with exposing ceca. Three quarters of a distal end of the cecum was ligated with a 4-0 silk thread and punctured with a 22G needle. The cecum was placed into a peritoneal cavity, and an incision was sutured with a 4-0 silk thread. After operation, the mouse was subcutaneously injected with 1 mL of sterile normal saline, which was namely a sepsis cecal ligation and puncture (CLP) model. At the same time, a Control group was set up (no cell injection, only CLP).

After 3 days, the mice were subjected to echocardiography again. Serum and cardiac tissue were collected, serum cTNI, LDH and lactic acid levels were detected, and levels of cardiac inflammatory factors and cardiac injury indexes were detected by qPCR. At the same time, a content of cardiac ATP was detected with a kit, and cardiac mitochondrial damage was detected with an electron microscope.

Figure 6:
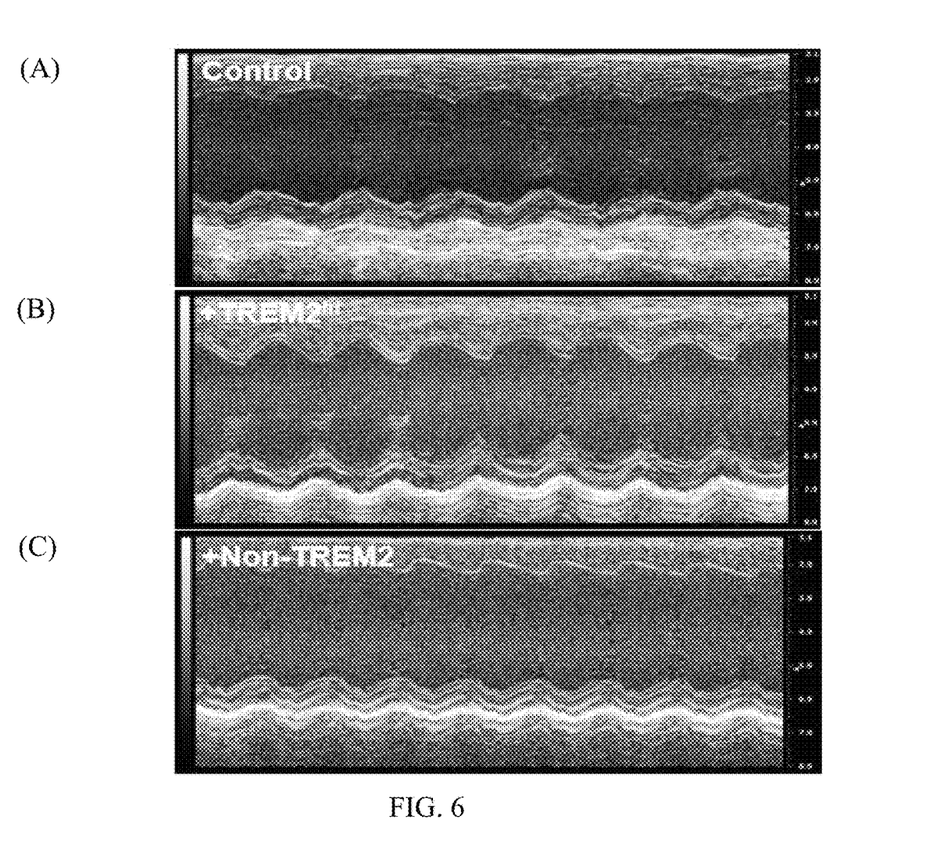
FIG. 6 shows echocardiography images of mice in a TREM2$^{hi}$ macrophage injection group and a control group with CLP-induced cardiac dysfunction in Embodiment 6, in which (A) is an echocardiography of a CLP model group without intrapericardial injection (Control group); (B) is an echocardiography of a mouse in the TREM2$^{hi}$ macrophage injection group (+TREM2$^{hi}$); (C) is an echocardiography of a mouse in a non-TREM2$^{hi}$ macrophage injection group (+Non-TREM2).
Figure 7:
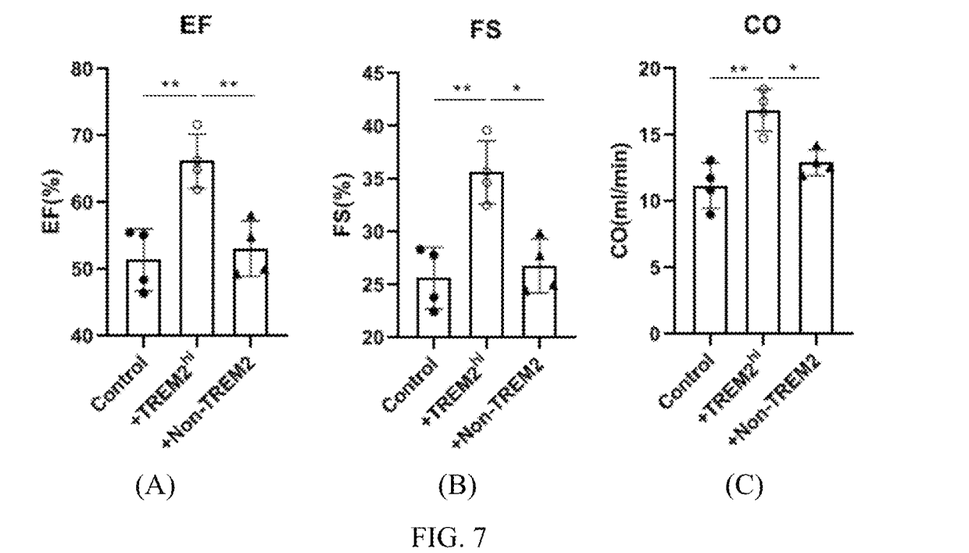
FIG. 7 shows analysis of ultrasonic indexes of the mice in the TREM2$^{hi}$ macrophage injection group and the control group after CLP in Embodiment 6, in which (A) is a cardiac ejection fraction (EF), (B) is a cardiac fractional shortening (FS), and (C) is a cardiac output (CO).

Results were shown in FIG. 6 and FIG. 7, and results in the Control group showed that a sepsis-induced cardiac dysfunction model was successfully established. Compared with the Non-TREM2 injection group, the EF (Ejection Fraction), FS (Fractional Shortening) and CO (cardiac output) of mice injected with TREM2$^{hi}$ macrophages were significantly improved, indicating that TREM2$^{hi}$ macrophages saved some cardiac functions.

Figure 8:
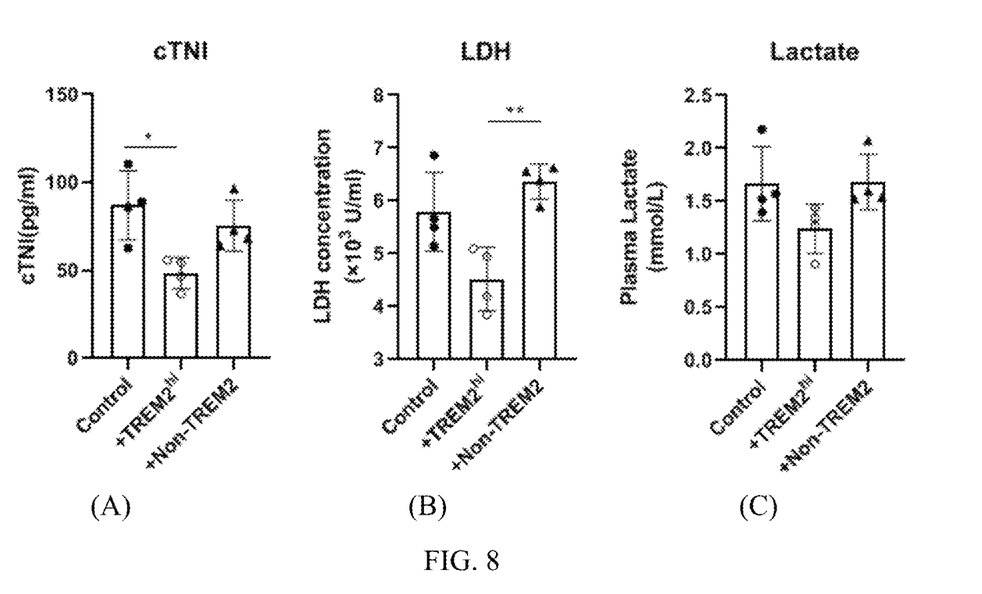
FIG. 8 shows analysis of levels of serum cardiac troponin I (cTNI), lactate dehydrogenase (LDH) and lactic acid of mice injected with TREM2$^{hi}$ macrophages and mice in the control group under the CLP model in Embodiment 6, in which (A) is cTNI, (B) is LDH, and (C) is lactic acid.

As shown in FIG. 8, during sepsis, compared with mice injected with Non-TREM2$^{hi}$ macrophages, mice injected with TREM2$^{hi}$ macrophages had lower levels of serum cTNI (Cardiac troponin), LDH (lactate dehydrogenase) and lactic acid.

Figure 9:
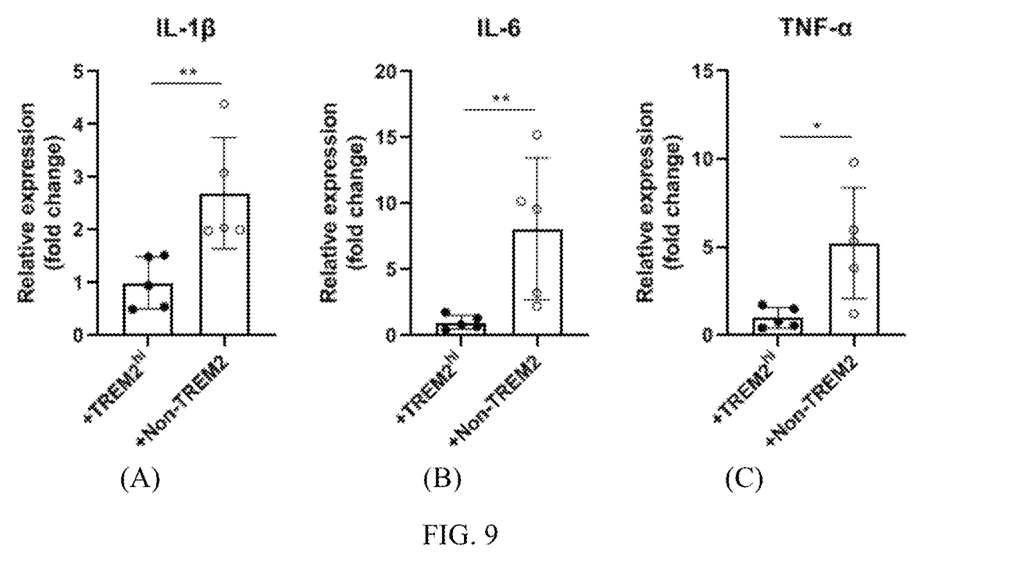
FIG. 9 shows mRNA analysis of inflammatory factors of the mouse injected with TREM2$^{hi}$ macrophages and the mouse in the control group after CLP in Embodiment 6, in which (A) is IL-1β, (B) is IL-6, and (C) is tumor necrosis factor-α (TNF-α).

As shown in FIG. 9, during sepsis, mRNA levels of inflammatory factors in the heart tissue of the mice injected with TREM2$^{hi}$ macrophages were lower than that in a Non-TREM2$^{hi}$ macrophage injection group.

Figure 10:
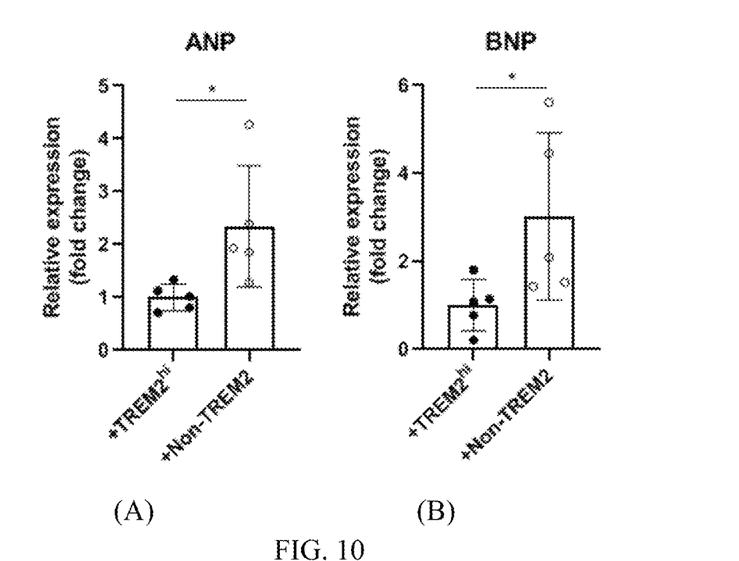
FIG. 10 shows mRNA levels of cardiac injury indexes in the mouse injected with TREM2$^{hi}$ macrophages and the mouse in the control group after CLP in Embodiment 6, in which (A) is atrial natriuretic peptide (ANP), and (B) is brain natriuretic peptide (BNP).

As shown in FIG. 10, during sepsis, levels of cardiac injury indexes in the heart tissue of the mice injected with TREM2$^{hi}$ macrophages were lower than that in the Non-TREM2$^{hi}$ macrophage injection group.

Figure 11:
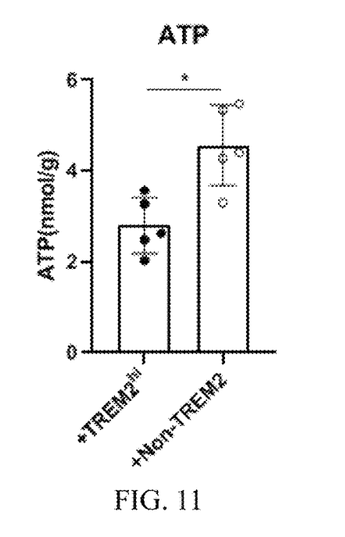
FIG. 11 shows contents of cardiac ATP of the mouse injected with TREM2hi macrophages and the mouse in the control group after CLP in Embodiment 6.
Figure 12:
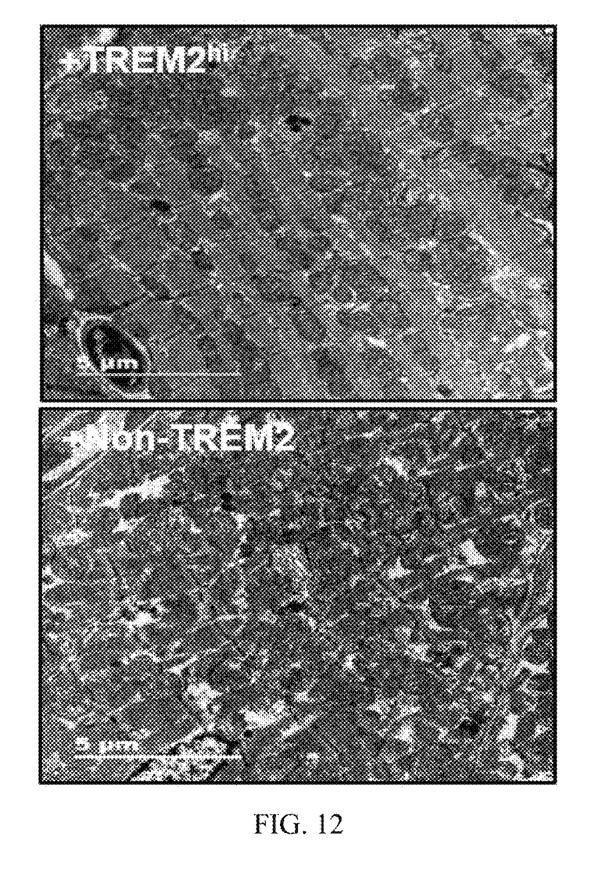
FIG. 12 shows morphology of mitochondria observed by an electron microscope of hearts of the mouse injected with TREM2hi macrophages and the mouse in the control group after CLP in Embodiment 6.

As shown in FIG. 11 and FIG. 12, during sepsis, the content of ATP in the heart tissue of the mice injected with TREM2$^{hi}$ macrophages was significantly higher than that in the Non-TREM2$^{hi}$ macrophage injection group, and the electron microscope images showed that the damage of heart mitochondria was lighter.

Embodiment 7 Improvement of Cardiac Function of Myocardial Infarction Mice by Heart Derived TREM2$^{hi}$ Macrophages by Intrapericardial Injection Mice were anesthetized, ventilated by endotracheal intubation parallel with a ventilator, and precordiums of the mice were sterilized with iodophor. A 2 cm incision was cut in a direction of a connecting line between a left axilla and a lower end of a sternum by using an intersection of a connecting line between a 3-4th intercostal space and the lower end of the sternum and a connecting line between the left axilla and the lower end of the sternum as a midpoint. Pectoralis major muscle and external rib muscle were dissected bluntly. A heart cavity was opened between 3rd and 4th ribs, an exposed heart was fixed. A left anterior descending coronary artery was ligated with a 7-0 nylon thread 2 mm below a horizontal line at a lower edge of a left atrial appendage. After successful ligation, the mice were respectively intrapericardially injected with the TREM2$^{hi}$ macrophages and the Non-TREM2$^{hi}$ macrophages (other cells excluding TREM2$^{hi}$ macrophages from CD45$^+$ immune cells) sorted in Embodiment 3. Thoraxes were closed and gas in the thoraxes was extracted. After the mice regained consciousness, the ventilator was removed. At the same time, a Control group was set up (no cell injection, only mouse myocardial infarction molding).

Figure 13:
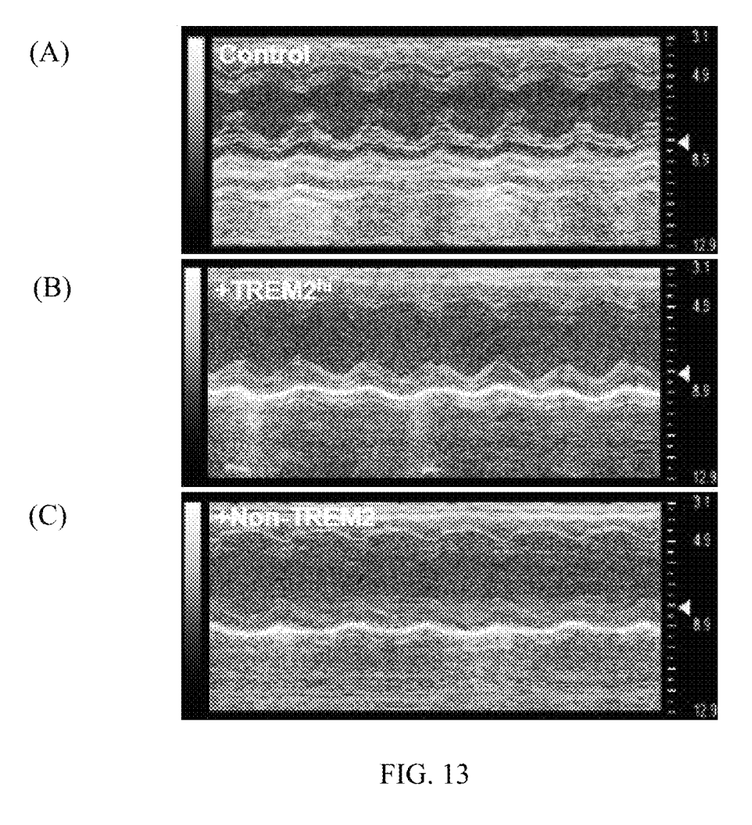
FIG. 13 shows echocardiography images of mice in a TREM2$^{hi}$ macrophage injection group and a control group after myocardial infarction in Embodiment 7, in which (A) is an echocardiography of a mouse myocardial infarction model group without intrapericardial injection (Control group); (B) is an echocardiography of a mouse in the TREM2$^{hi}$ macrophage injection group (+TREM2$^{hi}$); (C) is an echocardiography of a mouse in a non-TREM2$^{hi}$ macrophage injection group (+Non-TREM2).
Figure 14:
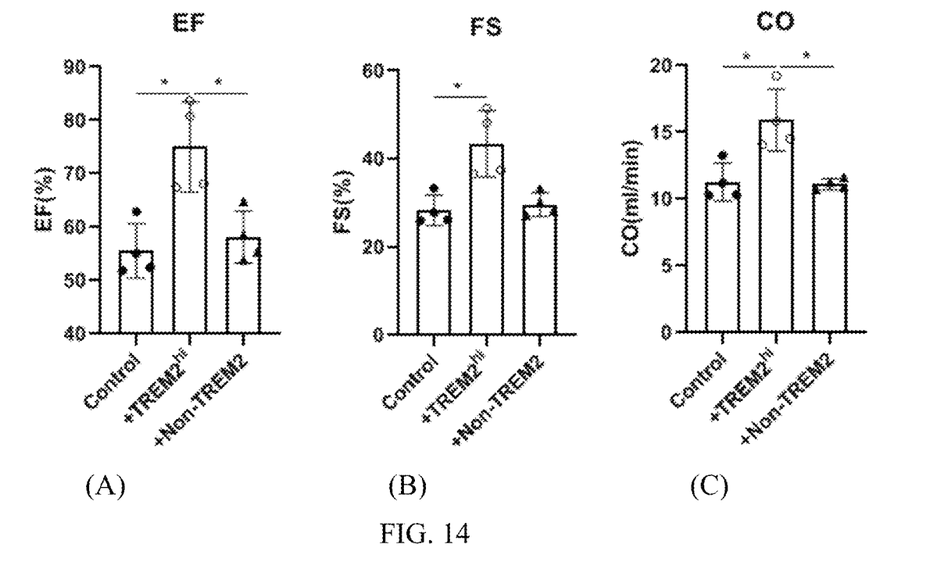
FIG. 14 shows analysis of ultrasonic indexes of the mice in the TREM2$^{hi}$ macrophage injection group and the Non-TREM2 group after myocardial infarction in Embodiment 7, in which (A) is a cardiac ejection fraction (EF), (B) is a cardiac fractional shortening (FS), and (C) is a cardiac output (CO).

One week later, the mice were subjected to echocardiography, and the changes of cardiac function were evaluated. Results were shown in FIG. 13 and FIG. 14, and results in the Control group showed that a model of cardiac dysfunction caused by myocardial infarction was successfully established. Compared with the Non-TREM2 injection group, the EF, FS and CO of mice injected with TREM2$^{hi}$ macrophages were significantly improved, indicating that TREM2$^{hi}$ macrophages saved some cardiac functions after myocardial infarction.

The invention claimed is:

1. A method of treating cardiac dysfunction in a subject, comprising the step of administering an effective amount of a drug comprising TREM2$^{hi}$ macrophages by intrapericardial injection, wherein the TREM2$^{hi}$ macrophages are macrophages that express a triggering receptor expressed on myeloid cells-2 (TREM2).

2. The method of claim 1, wherein the drug comprises an effective dose of TREM2$^{hi}$ macrophages and a pharmaceutically acceptable carrier.

3. The method of claim 1, wherein the method for preparing the TREM2$^{hi}$ macrophages for the drug comprises:

firstly, taking a cardiac ventricular tissue of a donor, conducting homogenate digestion to prepare a cell suspension, then conducting separation with a Percoll method to obtain a mixed solution of non-myocardial cells, then adding a TREM2 primary antibody to the mixed solution of non-myocardial cells, after incubation, adding a CD45 antibody, a CD 11b antibody, an F4/80 antibody, a CD 163 antibody and a TREM2 secondary antibody, conducting incubation, and finally, sorting out active nucleated CD45$^+$CD11b$^+$F4/80$^+$TREM2$^+$CD163$^+$ cells by fluorescence-activated cell sorting, obtaining the TREM2$^{hi}$ macrophages, and incorporating these cells into the drug.

4. The method of claim 1, wherein the cardiac dysfunction 1s manifested as increase of damaged mitochondria released by cardiomyocytes.

5. The method of claim 1, wherein the cardiac dysfunction is caused by sepsis.

6. The method of claim 1, wherein the cardiac dysfunction is caused by myocardial infarction.

7. The method of claim 1, wherein the drug improves the cardiac dysfunction by reducing the damaged mitochondria in the myocardial cells.

* * * * *